J. MERRITT.
RING FORMING TOOL.
APPLICATION FILED JUNE 28, 1912.

1,067,876.

Patented July 22, 1913.

Witnesses:-
W. H. Linton
Josephine M. Strempfer

Inventor:-
Joseph Merritt
by Harry R. Williams
Attorney

UNITED STATES PATENT OFFICE.

JOSEPH MERRITT, OF HARTFORD, CONNECTICUT.

RING-FORMING TOOL.

1,067,876.  Specification of Letters Patent.  Patented July 22, 1913.

Application filed June 28, 1912. Serial No. 706,405.

*To all whom it may concern:*

Be it known that I, JOSEPH MERRITT, a citizen of the United States, residing at Hartford, in the county of Hartford and State of Connecticut, have invented a new and useful Improvement in Ring-Forming Tools, of which the following is a specification.

This invention relates to a tool which is designed to form opened links or rings into closed links or rings.

The tool illustrated is particularly adapted for putting together and closing locked rings, although it may be used to form many other types of rings which are to be employed independently or to link together other links or rings.

The object of the invention is to provide a very simple, cheap, and easily manipulated tool which may be used to close tightly the opened ends of ring or link blanks and form the blanks into perfectly shaped rings or links which are independent or which join other links or rings.

Figure 1:
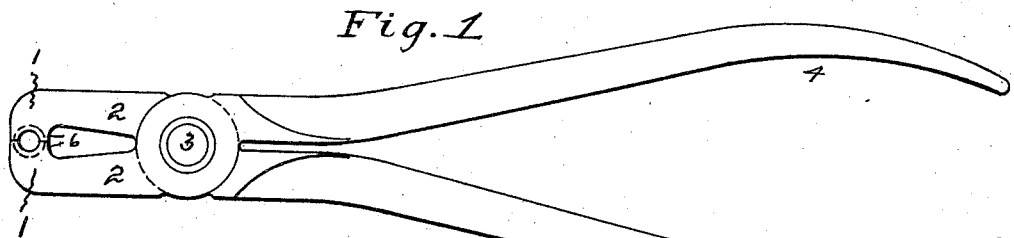
Figure 2:
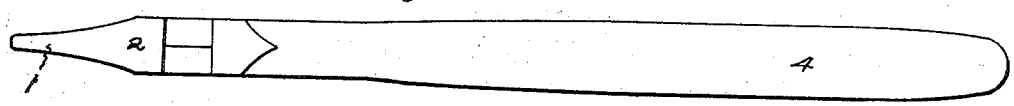
Figure 3:
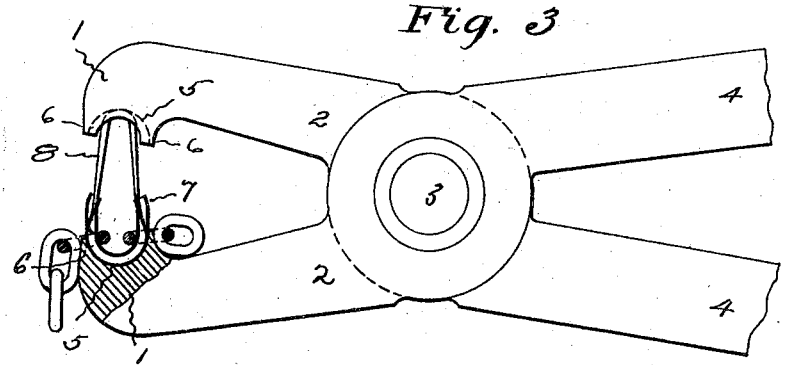
Figure 4:
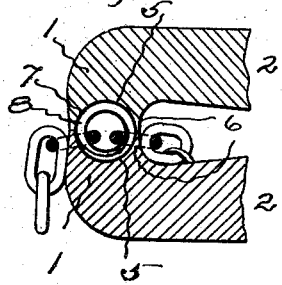
Figure 5:
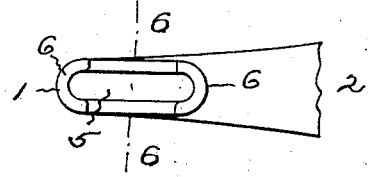
Figure 6:
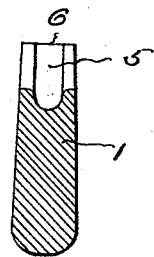

Figure 1 of the accompanying drawings shows a side view of a tool which embodies this invention. Fig. 2 shows an edge view of the same. Fig. 3 shows on larger scale a view of the jaw end with a portion of one jaw broken away, this view illustrating the manner of forming a locked ring from a tubular shell and solid core. Fig. 4 shows a central longitudinal section of the jaws closed upon a ring that connects other rings or links of a chain. Fig. 5 shows on still larger scale a plan of one of the jaws. Fig. 6 shows a transverse section of the jaw shown in Fig. 5, on the plane indicated by the dotted line 6—6.

The jaws 1 of the tool shown are formed so as to face toward each other on the inner sides near the ends of levers 2 that are pivotally held together by the stud 3. These levers are provided with manipulating handles 4 of such length that sufficient leverage can be obtained for the purpose of bringing the jaws together with power enough to give shape to the ring or link and tightly close the ends. Each of the jaws shown has a semi-circular opening with a corresponding semi-circular groove 5 in its face, this shape forming lips 6, one at each side of the jaw at the ends of the groove. These grooves are rounded in cross section, as shown in Fig. 6. When the tool is in use, the lips come together so as to form a closed die with a circular opening and containing a substantially annular groove that is practically semi-circular in cross section.

The tool illustrated is particularly designed for assembling the members of and forming said members into a closed and locked ring. Such a ring comprises a tubular blank 7 that is substantially U-shaped before its ends are closed, and a staple with tapering ends which is forced into the blank. As the ends of the tube are closed into ring shape the staple conforms to the interior and forms a solid core inside, as shown in Fig. 4. It is essential that the die for shaping these members be closed, that is, that the lips shall come together and back up the ring all around in order to insure the proper configuration for the ring. It is also essential, particularly when such a locked ring as is shown is formed, that the circular grooves which give the outline to the ring should be round in cross section in order to prevent distortion when the staple is forced in and the ends of the ring are brought together.

The tool illustrated is adapted to be used for forming and closing the ends of very small rings designed to be used as the links of a chain, or for joining together other rings or links. To accomplish this, as above stated, it is necessary that the lips come together so as to form a closed die which will give the correct shape and prevent distortion of the ring, and it is further necessary that these lips, which must come together, shall be of such shape that they will pass through the rings or links which are to be joined, as illustrated in Fig. 4. Therefore, the jaws are arranged on the inner edges of the levers and are shaped so that they, when closed, come together practically the same as if one was reciprocated toward the other in a straight line. This requires the jaws to be formed on the inner opposing edges of the ends of the levers, and that they project toward each other so as to provide space inside of the jaws for the link or links that are to be joined with the link or links on the outside of the jaws by the closing of a ring.

The invention claimed is:

1. A ring forming tool comprising pivoted members which terminate in projections that form abutting jaws, said jaws being transversely and longitudinally grooved to provide a ring-shaped cavity between them when closed, and having the abutting portions of restricted area whereby they may when closed around a ring enter the adjacent rings of a chain, substantially as set forth.

2. A ring forming tool comprising pivoted members which terminate in projections that form abutting jaws, said jaws being transversely and longitudinally grooved to provide a ring-shaped cavity between them when closed, the abutting portions of the jaws being of less cross-sectional area than the diameter of the ring cavity, whereby when closed around the ring they may enter the adjacent rings of a chain, substantially as set forth.

3. A ring forming tool having jaws mounted to open from and close against each other, said jaws having transverse and longitudinal grooves which provide a ring-shaped cavity when the jaws are together, the abutting portions of the jaws being of less cross-sectional area than the diameter of the ring cavity, whereby when closed around a ring they may enter the adjacent rings of a chain, substantially as set forth.

4. A ring forming tool having jaws mounted to open from and close against each other, said jaws having transverse and longitudinal grooves which provide a ring-shaped cavity when the jaws are together, and the abutting portions of the jaws being of restricted area and conforming in cross-section to the cross-section of the ring cavity, whereby when closed around a ring they may enter the adjacent rings of a chain, substantially as set forth.

JOSEPH MERRITT.

Witnesses:
  EDWARD H. LORENZ,
  CHARLOTTE S. HULL.

---

Copies of this patent may be obtained for five cents each, by addressing the "Commissioner of Patents, Washington, D. C."